US012789200B2

(12) United States Patent
Summerville et al.

(10) Patent No.: US 12,789,200 B2
(45) Date of Patent: Nov. 10, 2026

(54) REMOVING A FERROMAGNETIC LIQUID FROM A SURFACE

(71) Applicant: Lenovo Enterprise Solutions (Singapore) Pte Ltd., Singapore (SG)

(72) Inventors: Mark K Summerville, Apex, NC (US); Justin Michael Ringuette, Cary, NC (US); Mark Christopher Heidenfeldt, Apex, NC (US); Sandy Collins, Durham, NC (US); Thomas E Annunziata, Raleigh, NC (US)

(73) Assignee: Lenovo Enterprise Solutions (Singapore) Pte Ltd., Singapore (SG)

( * ) Notice: Subject to any disclaimer, the term of this patent is extended or adjusted under 35 U.S.C. 154(b) by 82 days.

(21) Appl. No.: 18/398,536

(22) Filed: Dec. 28, 2023

(65) Prior Publication Data

US 2025/0214088 A1 Jul. 3, 2025

(51) Int. Cl.
*B08B 1/14* (2024.01)
*B03C 1/30* (2006.01)
*B08B 5/04* (2006.01)

(52) U.S. Cl.
CPC ................ *B03C 1/30* (2013.01); *B08B 1/145* (2024.01); *B08B 5/04* (2013.01)

(58) Field of Classification Search
CPC .............. B03C 1/30; B08B 1/145; B08B 5/04
See application file for complete search history.

(56) References Cited

U.S. PATENT DOCUMENTS

2007/0164427 A1* 7/2007 Sauciuc ................ H01L 23/427 257/714
2008/0023665 A1* 1/2008 Weiser ................ H01L 23/3737 257/E23.107
2008/0291634 A1* 11/2008 Weiser .................... H01L 23/42 361/708

(Continued)

FOREIGN PATENT DOCUMENTS

WO WO-2004008497 A2 * 1/2004 ............. B32B 15/16

OTHER PUBLICATIONS

CN 206415395 (Year: 2017).*
KR 20-0412527 (Year: 2006).*
CN 107532129 (Year: 2022).*

*Primary Examiner* — Alexander Markoff
(74) *Attorney, Agent, or Firm* — Jeffrey L. Streets

(57) ABSTRACT

A deposit of a ferromagnetic liquid is removed from a surface using a removal device after separating a first component from engagement with a second component, wherein the ferromagnetic liquid may be a thermal interface material disposed between the first and second components to increase heat conduction therebetween. A removal device that includes a magnet is used to remove a deposit of the ferromagnetic liquid that remains on the surface of the first component after separation from the second component. The ferromagnetic liquid is magnetically attracted to the magnet of the removal device to facilitate removal. Some removal devices include the magnet and a liquid-permeable material covering a surface of the magnet. The liquid-permeable material is configured to directly contact the ferromagnetic liquid and the magnet is configured to draw the ferromagnetic liquid into the liquid-permeable material and retain the ferromagnetic liquid within the liquid-permeable material.

20 Claims, 7 Drawing Sheets

(56) References Cited

U.S. PATENT DOCUMENTS

| | | | | |
|---|---|---|---|---|
| 2010/0062415 | A1* | 3/2010 | Schwoebel | G01N 21/07<br>435/5 |
| 2011/0104747 | A1* | 5/2011 | Pollack | B01F 33/3031<br>435/40.5 |
| 2015/0061173 | A1* | 3/2015 | Murata | B29C 44/143<br>442/164 |
| 2015/0345049 | A1* | 12/2015 | Tokarev | D01D 5/0092<br>264/429 |
| 2017/0266653 | A1* | 9/2017 | Pollack | B03C 1/0335 |

* cited by examiner

REMOVING A FERROMAGNETIC LIQUID FROM A SURFACE

BACKGROUND

The present disclosure relates to methods and apparatus for removing a ferromagnetic liquid from a surface.

BACKGROUND OF THE RELATED ART

A thermal interface material ("TIM") is any material that is inserted between two components in order to enhance the thermal coupling between the two components. A TIM is often inserted between a heat-producing device such as an integrated circuit and a heat-dissipating device such as a heat sink. At the interface of each component, a thermal resistance exists and impedes heat dissipation. An effective TIM may be positioned in contact with both of the two components to reduce the thermal resistance at each interface. A few TIMs include a thermal grease, thermal paste, thermal adhesive, thermal gap filler, thermally conductive pads, and liquid metal.

Compared to conventional TIMs such as thermal grease and solder, liquid metal (LM) TIMs offer several advantages owing to their intrinsically high thermal and electrical conductivities, flexibility, and low melting points. Moreover, their unique properties, such as a low vapor pressure, subcooling, and biocompatibility, enable their use in various thermal management applications. However, when cleaning up liquid metal from a thermal interface between two components on a system board of a computer, liquid metal may accidentally drop or leak onto the system board and pose a hazard to the system board.

Attempts to wipe up liquid metal with conventional cleaning supplies are largely unsuccessful because liquid metal does not readily cling to or absorb into cleaning wipes or cotton swabs. Furthermore, it can be quite difficult to protect the system board by masking before moving major components like a heat sink.

BRIEF SUMMARY

Some embodiments provide a method of removing a deposit of a ferromagnetic liquid from a surface. The method may include separating a first component from thermal engagement with a second component, wherein a ferromagnetic liquid thermal interface material is disposed between the first component and the second component to increase heat conduction from the first component to the second component. The method may further include using a removal device that includes at least one magnet to remove an amount of the ferromagnetic liquid thermal interface material that remains on a surface of the first component after the second component has been separated from the first component, wherein the ferromagnetic liquid thermal interface material is magnetically attracted to the removal device by the at least one magnet.

Some embodiments provide a device for removing a ferromagnetic liquid from a surface. The device may include at least one magnet capable of attracting the ferromagnetic liquid and a liquid-permeable material covering at least one surface of the at least one magnet. The liquid-permeable material is configured to directly contact a deposit of the ferromagnetic liquid disposed on a surface and the at least one magnet is configured to draw the ferromagnetic liquid into the liquid-permeable material and retain the ferromagnetic liquid within the liquid-permeable material.

DETAILED DESCRIPTION

Figure 1:
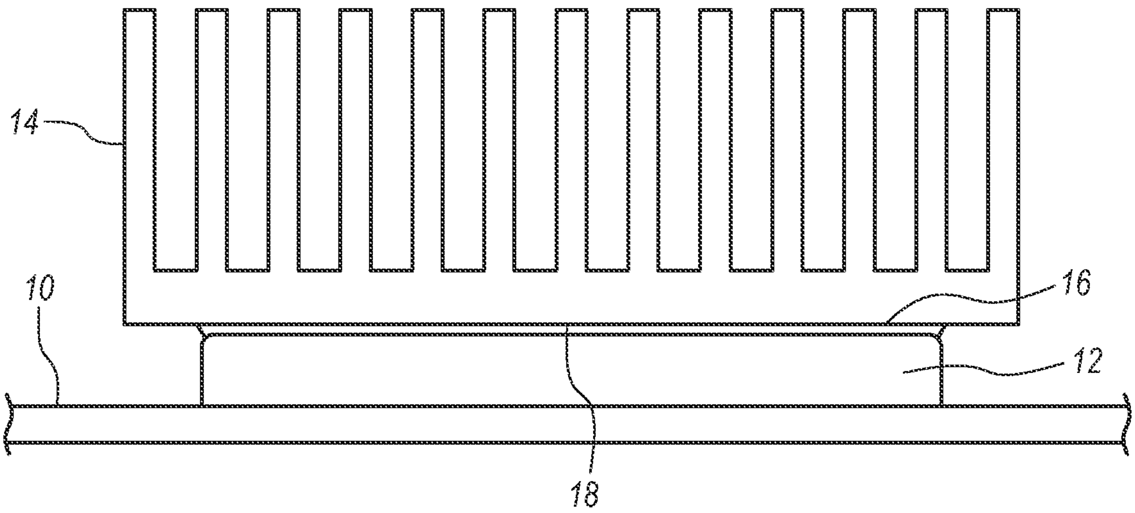
FIG. 1 is a diagram of a system board having a processor that is cooled by a heatsink with a thermal interface material between the processor and a base of the heatsink.

Some embodiments provide a method of removing a deposit of a ferromagnetic liquid from a surface. The method may include separating a first component from engagement with a second component, wherein a ferromagnetic liquid is disposed between the first component and the second component. The method may further include using a removal device that includes at least one magnet to remove an amount of the ferromagnetic liquid that remains on a surface of the first component after the second component has been separated from the first component, wherein the ferromagnetic liquid is magnetically attracted to the removal device by the at least one magnet.

The ferromagnetic liquid may be any known liquid with ferromagnetic properties or components. Some ferromagnetic liquids may be formulated or infused with ferromagnetic particles, such as an iron or nickel powder, iron or nickel filings, or other magnetic materials. A ferromagnetic liquid may be strongly attracted to a magnet secured or embedded in a removal device, such as a cleaning wipe, swab or syringe. Embodiments herein have been shown to greatly improve the capturing and clearing of a ferromagnetic liquid from both flat surfaces and the finest structures, such as crevices. Furthermore, the embodiments may improve retention of the ferromagnetic liquid within the removal device to prevent redepositing of the ferromagnetic liquid elsewhere. The ferromagnetic liquid may have a wide range of viscosity that includes a grease or paste at the higher end of the viscosity range. Non-limiting examples of a ferromagnetic liquid include a thermal interface material (TIM) that enhances thermal conduction between two components, an electrical interface material that enhances electrical conduction between two components, or a mechanical interface material that performs some beneficial mechanical purpose, such as reducing friction between two components.

In some embodiments, the liquid thermal interface material may be a liquid metal. For example, a ferromagnetic liquid metal thermal interface material may include an alloy of gallium, indium and tin that has been infused with iron powder or filings. Galinstan® (a registered trademark of the Geratherm company) is a brand name for an alloy composed of gallium, indium, and tin which melts at −19° C. (−2° F.) and is thus liquid at room temperature. Galinstan is believed to be composed of 68.5% Ga, 21.5% In, and 10.0% Sn (by weight). Galinstan is highly corrosive and should not be spread indiscriminately or allowed to accidentally drip onto components that are not resistant to Galinstan.

The term "ferromagnetic liquid" refers to a liquid that can either be attracted by the magnetic field of a magnet (i.e., are magnetically responsive; temporarily induced magnetization) or can provide the magnetic field that attracts other ferromagnetic materials (i.e., are magnetized; permanent magnetization). For example, a liquid containing iron or nickel powder, filings or other particles may be responsive to an external magnetic field and is therefore a ferromagnetic liquid. In a contrasting example, a liquid containing magnetic particles may form a magnetic field that attracts other ferromagnetic materials or components and is therefore a ferromagnetic liquid. Accordingly, the term "ferromagnetic liquid" may refer to both magnetically response liquids and magnetized liquids. Without limitation, a ferromagnetic liquid may be a "ferromagnetic liquid metal" or a "ferromagnetic liquid metal interface material" or "liquid metal thermal interface material."

Various embodiments are described herein, including the descriptions of FIGS. 3A-10B, as involving a removal device that includes at least one magnet to attract and remove an amount of a ferromagnetic liquid deposited on a surface. In these embodiments, the magnet(s) form the magnetic field that attracts the ferromagnetic liquid. However, any of the embodiments disclosed herein may be modified so that the ferromagnetic liquid is magnetized and forms the magnetic field, wherein the at least one magnet may optionally be replaced with an unmagnetized ferromagnetic material, such as an iron-containing metal or a nickel-containing metal. It should be appreciated that each disclosed removal device may remove the ferromagnetic liquid so long as there is a magnetic field formed by the device and/or the ferromagnetic liquid and so long as either of the device or the ferromagnetic liquid that is not magnetized are ferromagnetic (i.e., magnetically responsive). For example, if the ferromagnetic liquid is itself magnetized, then the cloth sheet, swab and/or syringe may have their magnet(s) replaced with an unmagnetized ferromagnetic metal. A magnetized ferromagnetic liquid may be prepared with extremely small magnetic particles entrained in the liquid, such as a liquid slurry containing gallium. Optionally, the magnetic particles could be formed to have a density that more closely approximates the density of liquid gallium than does iron powder.

In some embodiments, the first component is an electronic device, and the second component is a cooling device. Electronic devices, such as integrated circuits, pass electrical current and generate heat as a byproduct of that electrical current. In some instances, the heat must be removed with a cooling device to prevent the electronic device from reaching an operating temperature that either damages the electronic device or causes inefficient operation of the electronic device. Non-limiting examples of the cooling device include a heatsink and a liquid cooling plate. A typical heat sink has a base that thermally engages the electronic device and a set of fins extending away from the base, such that air circulation across the surfaces of the fins will absorb heat from the fins and carry that heat away from the heatsink. A typical liquid cooling plate will also thermally engage the electronic component, but the cooling plate has internal channels where a cooling fluid may be circulated between a cooling fluid inlet and a cooling fluid outlet. Accordingly, the cooling fluid absorbs the heat generated by the electronic device and carries that heat away when it passes through the cooling fluid outlet.

In some embodiments, the removal device includes a liquid-permeable cloth sheet secured to the at least one magnet. The term "cloth" refers to a pliable material made usually by weaving, felting, or knitting natural or synthetic fibers and filaments. A "cloth sheet" is one or more pieces of cloth that has a broad surface relative to its thickness. The at least one magnet may be secured in any manner, such as with use of an adhesive, a fastener, pockets, or via quilting. Some manners of securing the at least one magnet may be temporary, such as pockets, and some manners of securing the at least one magnet may be permanent, such as sewing or quilting. Where the at least one magnet is a plurality of magnets, each of the magnets is preferably secured to the same side of the cloth sheet so that the opposite side of the cloth sheet is free from magnets for contacting the ferromagnetic liquid.

Some embodiments may further include placing, such as wiping, blotting or other manner of engaging, the liquid-permeable cloth sheet in contact with the surface of the first component. As the liquid permeable cloth sheet contacts the surface, the at least one magnet attracts the ferromagnetic liquid thermal interface material into the liquid-permeable cloth sheet and retains the ferromagnetic liquid thermal interface material within the liquid-permeable cloth sheet. The liquid-permeable cloth sheet has pore spaces or voids that allow the ferromagnetic liquid to flow therethrough toward the at least one magnet. Specifically, the at least one magnet forms a magnetic field that extends through the thickness of the liquid-permeable cloth sheet such the magnetic field may act upon the ferromagnetic liquid. The pore spaces and/or voids provide a matrix that, in combination with the at least one magnet, supports and retains the ferromagnetic liquid.

In some embodiments, the removal device includes a liquid-permeable swab secured to a distal end of a rod, wherein the distal end of the rod is formed by the at least one magnet. Similar to the liquid-permeable cloth sheet secured to at least one magnet, the liquid-permeable swab may be temporarily or permanently secured to the distal end of the rod that forms the magnet. For example, the liquid-permeable swab may be permanently secured to the rod with an adhesive. In another example, the liquid-permeable swab may be temporarily secured to the rod by configuring the swab like a sock that fits snugly over the distal end of the rod or is otherwise securable over the distal end of the rod. The liquid-permeable swab and magnet may remove a ferromagnetic liquid in substantially the same manner as described for the liquid-permeable cloth sheet and magnet. The primary difference between the liquid-permeable swab and liquid-permeable cloth sheet is the physical configuration (i.e., size and shape). Specifically, a liquid-permeable cloth sheet with at least one magnet may be well-suited for removing ferromagnetic liquid over a large and easily accessible area, such as the top surface of a component. By contrast, a liquid permeable swab with at least one magnet may be well-suited for removing ferromagnetic liquid from a small and difficult to reach area, such as a crevice within a component or between two components.

Some embodiments may further include engaging the liquid-permeable swab with a surface of the first component, wherein the at least one magnet attracts the ferromagnetic liquid thermal interface material into the liquid-permeable swab and retains the ferromagnetic liquid thermal interface material within the liquid-permeable swab. A user may manually manipulate the liquid-permeable swab by holding the rod with their fingers.

In some embodiments, the removal device is a syringe having a needle tip that includes the at least one magnet. The syringe may include a barrel, a plunger that is slidable within the barrel, and the needle tip, wherein the needle tip forms a passageway into the barrel below the plunger. Without limitation, the at least one magnet may be a ring that extends around the opening in the needle tip or a plurality of magnets positioned around the opening in the tip. A preferred syringe is a 1 milliliter (mL) syringe with a tip that is adapted for a 23 gauge needle. The size of the opening in the needle tip is preferably large enough to allow the ferromagnetic liquid to easily flow through the tip despite potentially containing iron filings or having a high viscosity. Furthermore, the plunger of the syringe could have a magnet that helps draw the ferromagnetic liquid into the syringe.

Some embodiments may further include positioning the needle tip of the syringe adjacent a pool of the ferromagnetic liquid that remains on the surface of the first component, wherein the at least one magnet attracts the pool of ferromagnetic liquid to an opening that leads to the passageway in the tip. In this position, a user may then actuate (pull) the plunger relative to the barrel to form a suction that pulls the ferromagnetic liquid from the area of the opening through the passageway and into the barrel. Subsequently, the plunger may be pressed into the barrel to dispense the ferromagnetic liquid into a container, such as a waste collection container or a recycling collection container. The syringe may be used to remove ferromagnetic liquid from the surface and dispense the ferromagnetic liquid into a container through any number of cycles.

Some embodiments provide a device for removing a ferromagnetic liquid from a surface. The device may include at least one magnet capable of attracting the ferromagnetic liquid and a liquid-permeable material covering at least one surface of the at least one magnet. The liquid-permeable material is configured to directly contact a deposit of the ferromagnetic liquid disposed on a surface and the at least one magnet is configured to draw the ferromagnetic liquid into the liquid-permeable material and retain the ferromagnetic liquid within the liquid-permeable material.

Embodiments of the device may include any of the structures, configurations, and materials described herein, including the description of methods for removing a ferromagnetic liquid.

In some embodiments, each of the plurality of magnets are secured to a back side of the cloth sheet in a spaced-apart pattern leaving a front side of the cloth sheet for contacting the surface and preventing direct contact between any of the plurality of magnets and the surface.

In some embodiments, the liquid-permeable material is secured to a distal end of a rod, and the distal end of the rod is formed by the at least one magnet. In one option, the liquid-permeable material may be a wad of fibers. In another option, the liquid-permeable material forms a cover or sock that is manually securable to the distal end of the rod and manually removable from the distal end. Such a cover or sock may be disposable so that the rod with the magnet is reusable. Furthermore, the liquid-permeable material may be attached to a liquid-impermeable inside layer or liner that contacts the at least one magnet and prevents the ferromagnetic liquid from contacting the at least one magnet. Accordingly, removal of a temporary cover or sock having a liquid-impermeable inside layer or liner will leave the magnet in a clean state.

Some embodiments may provide a kit, such as a Field Replaceable Unit (FRU) kit, that includes one or more of the removal devices described herein. The kit may optionally further include a replacement component and/or replacement ferromagnetic liquid. For example, the replacement component may be a heat sink and/or the replacement ferromagnetic liquid may be a thermal interface material. The removal devices may be used to clean up the old or used ferromagnetic liquid thermal interface material, such as a liquid metal or other liquid metal or paste. Any replacement component and/or a container of replacement ferromagnetic liquid included in the kit may then be installed in a system. Even if the material to be removed is not a ferromagnetic liquid, the removal device may still be used since the magnets will not interfere with removing non-ferromagnetic liquids.

In one example, a method may begin with use of a syringe with at least one magnet to remove any large quantities of the ferromagnetic liquid from a surface. When no more of the deposits of ferromagnetic liquid may be removed with a syringe, a liquid-permeable cloth sheet with one or more magnets may be used to contact the surface, such as by wiping the cloth sheet over the surface. After removing as much of the ferromagnetic liquid as possible with the cloth sheet, a liquid-permeable swab with a magnet in the distal end may be used to dap up any remaining ferromagnetic liquid in less accessible areas. Optionally, the same or different syringe, cloth sheet and/or swab may also be used to remove ferromagnetic liquid from a cooling device removed from the surface.

In some embodiments, any final film or trace amounts of the ferromagnetic liquid may be removed by applying isopropyl alcohol and then wiping with a cloth, such as a clean cloth sheet with a magnet. The isopropyl alcohol may be applied to the surface having the ferromagnetic liquid film or trace amounts or may be applied to the cloth.

FIG. 1 is a diagram of a system board 10 having a processor 12, such as a central processing unit (CPU), that is cooled by a heatsink 14 with a ferromagnetic liquid thermal interface material (TIM) 16 between the processor 12 and a base 18 of the heatsink 14. Over time, there may be need to replace the heatsink 14, the processor 12 and/or the ferromagnetic liquid thermal interface material 16. In any of these scenarios, it may be necessary to remove a deposit of the ferromagnetic liquid thermal interface material 16 from a surface of the processor 12 or from the base 18 of the heatsink 14.

Figure 2:
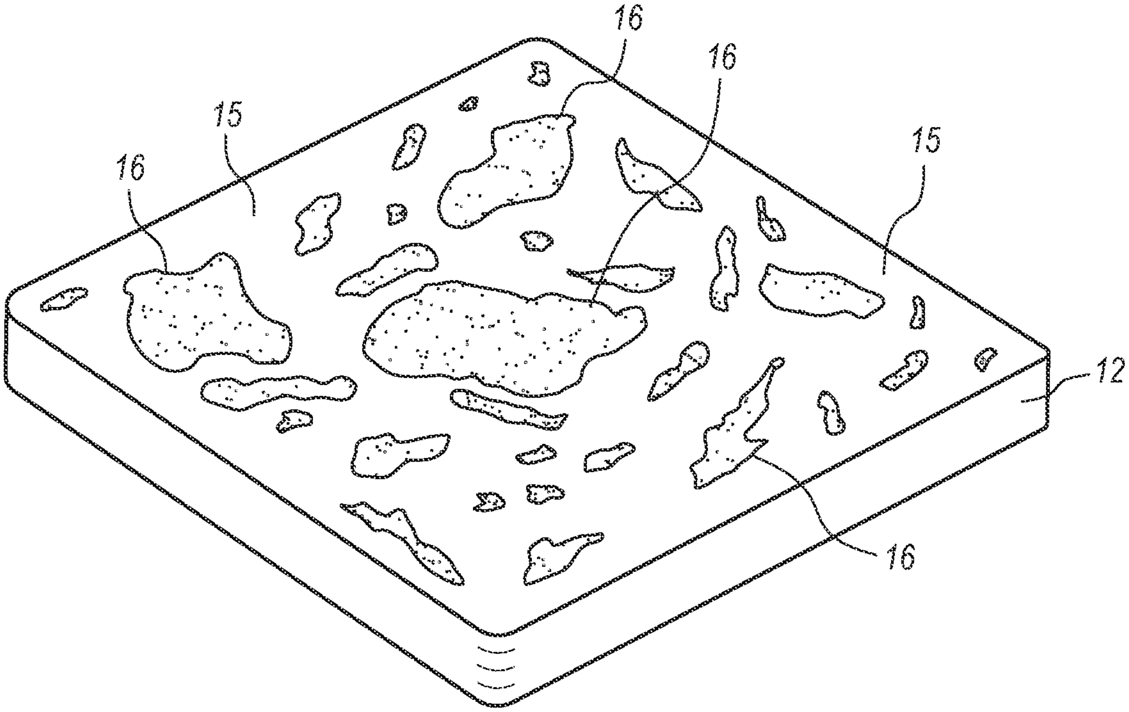
FIG. 2 is a perspective view a component having a top surface where there is a deposit of a ferromagnetic liquid.

FIG. 2 is a perspective view the processor 12 where there is a deposit of a ferromagnetic liquid 16 remaining on the surface 15 of the processor 12 after the heatsink 14 (see FIG. 1) has been removed. The ferromagnetic liquid 16 may be corrosive or otherwise hazardous to the system board, components on the system board, or personnel removing the ferromagnetic liquid. Accordingly, the deposits of ferromagnetic liquid 16 should be removed carefully and thoroughly.

Figure 3A:
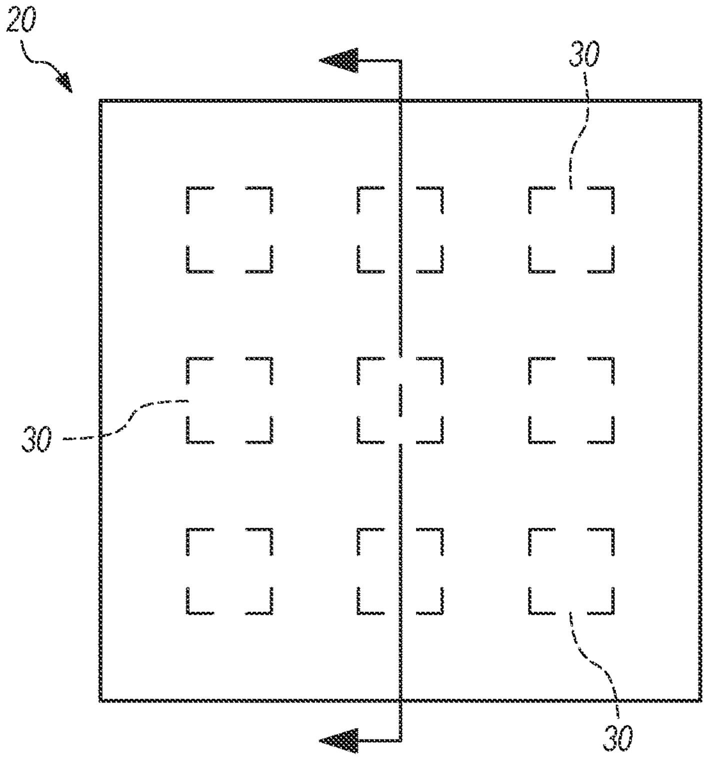
FIGS. 3A-B include a plan view and a cross-sectional side view of a cloth sheet and magnets for removing liquid metal thermal interface material from a surface according to one embodiment.
Figure 3B:
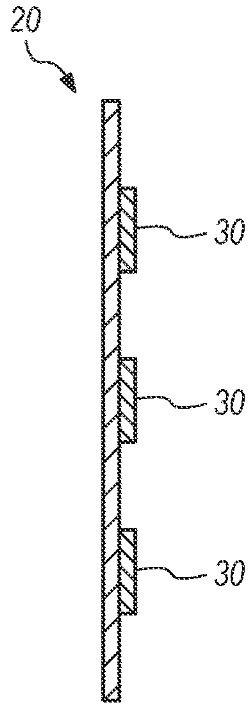

FIGS. 3A-B include a plan view and a cross-sectional side view of a cloth sheet 20 and magnets 30 for removing a ferromagnetic liquid, such as a liquid metal (LM) thermal interface material (TIM) from a surface according to one embodiment. The plurality of magnets 30 (9 shown) are secured to a back side of the cloth sheet 20. The magnets 30 may be secured in any manner, such as with use of an adhesive, thread or other fastener.

Figure 4A:
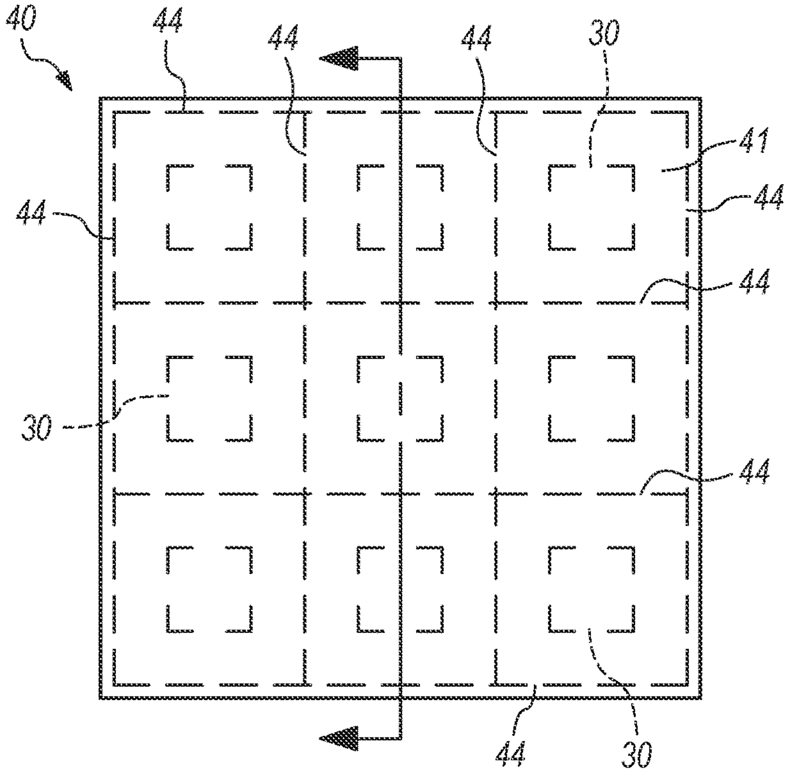
FIGS. 4A-B include a plan view and a cross-sectional side view of a cloth sheet and magnets for removing liquid metal thermal interface material from a surface according to another embodiment.
Figure 4B:
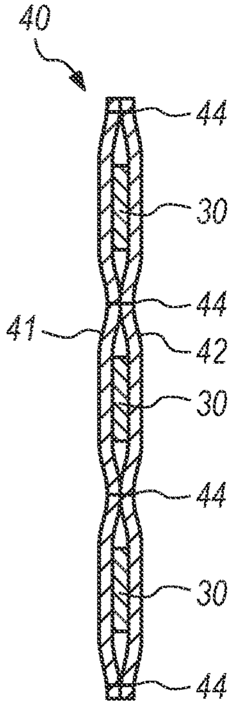

FIGS. 4A-B include a plan view and a cross-sectional side view of a cloth sheet 40 and magnets 30 for removing ferromagnetic liquid from a surface according to another embodiment. The magnets 30 (9 shown) are disposed between two layers 41, 42 of cloth and the two layers 41, 42 are sewn together with thread forming lines 44 that extend along the perimeter edges of the cloth sheet 40 and between adjacent magnets 30. Accordingly, each of the magnets 30 are secured in a spaced-apart location between the two layers 41, 42. Notably, both sides of the cloth sheet 40 may be used to remove ferromagnetic liquid.

Figure 5A:
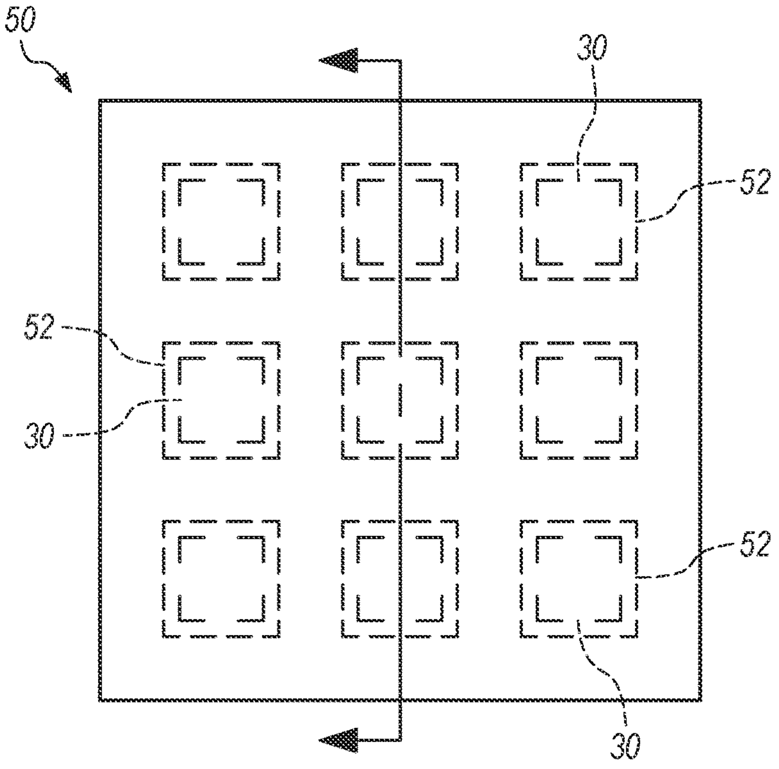
FIGS. 5A-B include a plan view and a cross-sectional side view of a cloth sheet and magnets for removing liquid metal thermal interface material from a surface according to a further embodiment.
Figure 5B:
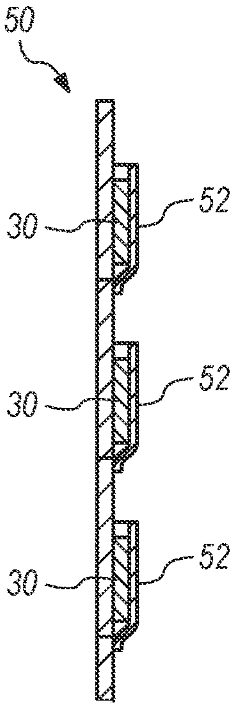

FIGS. 5A-B include a plan view and a cross-sectional side view of a cloth sheet 50 and magnets 30 for removing ferromagnetic liquid from a surface according to a further embodiment. The magnets 30 (9 shown) are secured in individual pockets 52 (9 shown) on the back side of the cloth sheet 50. In one option, each pocket may be formed with the same liquid-permeable cloth material as the front side of the cloth sheet 50. In a further option, the pockets 52 may be formed by sewing a patch of cloth along three sides (i.e., lower, left and right sides) leaving a fourth side (i.e., the top side) open. A magnet 30 may be inserted into the open side of the pocket 52 prior to use of the cloth sheet 50 and, potentially, removed from the pocket 52 after use.

Figure 6A:
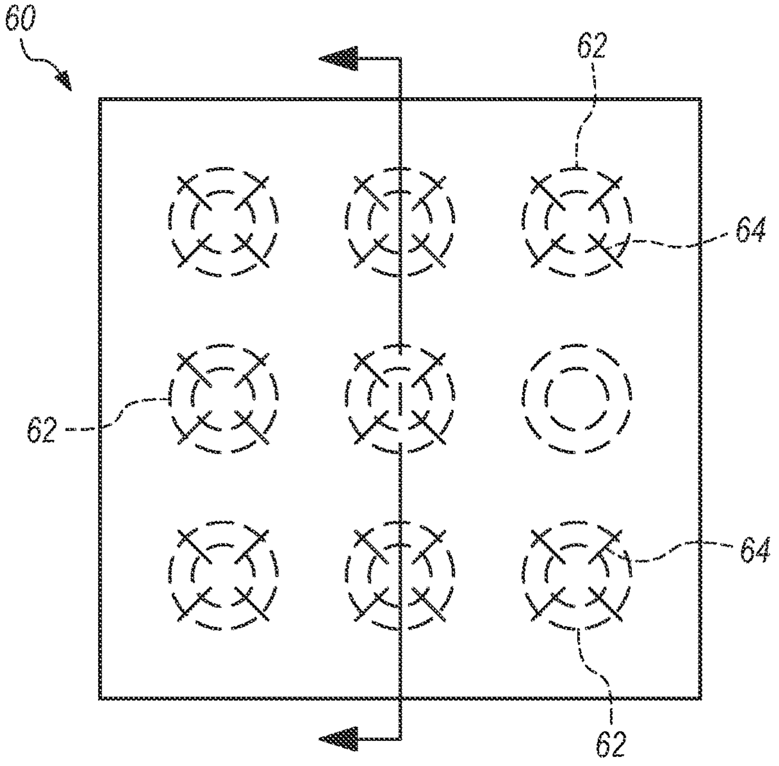
FIGS. 6A-B include a plan view and a cross-sectional side view of a cloth sheet and magnets for removing liquid metal thermal interface material from a surface according to yet another embodiment.
Figure 6B:
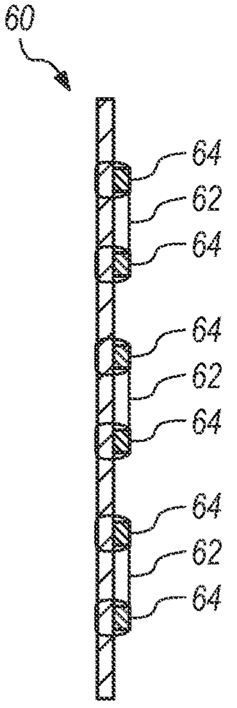

FIGS. 6A-B include a plan view and a cross-sectional side view of a cloth sheet 60 and magnets 30 for removing ferromagnetic liquid from a surface according to yet another embodiment. The magnets 62 (9 shown) are formed in the shape of rings so that they can be stitched to the back side of the cloth sheet 60 using thread 64 (illustrated as four stitches per magnet 30).

Figure 7A:
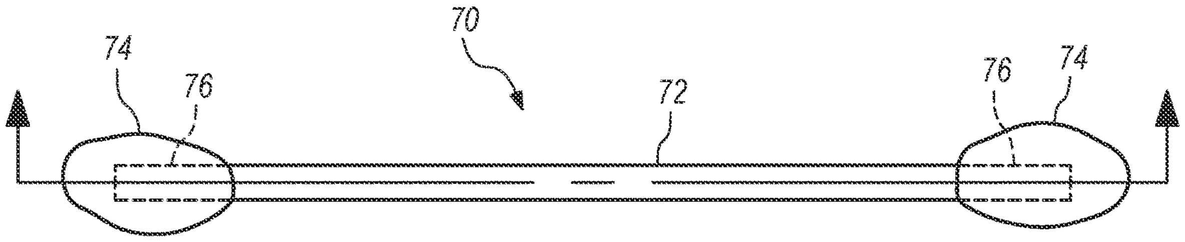
FIG. 7A is a diagram of a swab, such as a cotton swab, including a rod with wads of a porous or fibrous material secured to each end of the rod.
Figure 7B:
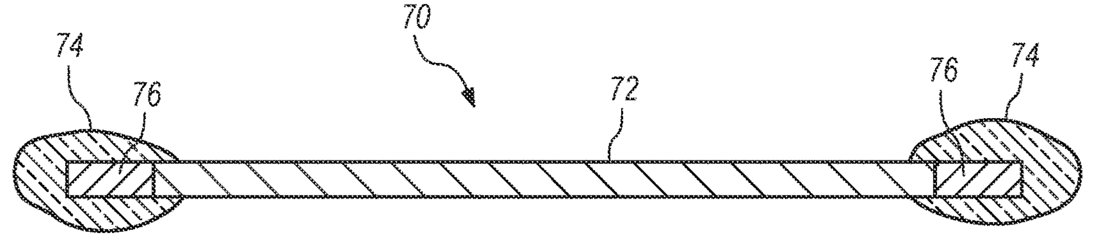
FIG. 7B is a cross-sectional diagram of the swab in FIG. 2A highlighting the position of a magnet forming a part of the rod beneath the wads of porous or fibrous material.

FIG. 7A is a diagram of a swab 70, such as a cotton swab, including a rod 72 with liquid-permeable material 74 of a porous or fibrous material secured to each end (left and right ends) of the rod 72. Each distal end of the rod 72 secures a magnet 76 that is covered by the liquid-permeable material 74. The liquid-permeable material 74 may be a wad of fibrous material, such as cotton, that may be adhered to the rod over the area of the magnet 76. Alternatively, the liquid-permeable material 74 may be a cloth sock that fits over the area of the magnet 76. Optionally, the cloth sock may be removeable and/or replaceable. Furthermore, a swab may be made with a magnet and/or liquid-permeable material 74 at just one end of the rod 72. FIG. 7B is a cross-sectional diagram of the swab 70 in FIG. 2A highlighting the position of the magnet 76 forming a part of the rod 72 beneath the liquid-permeable material 74.

Figure 8:
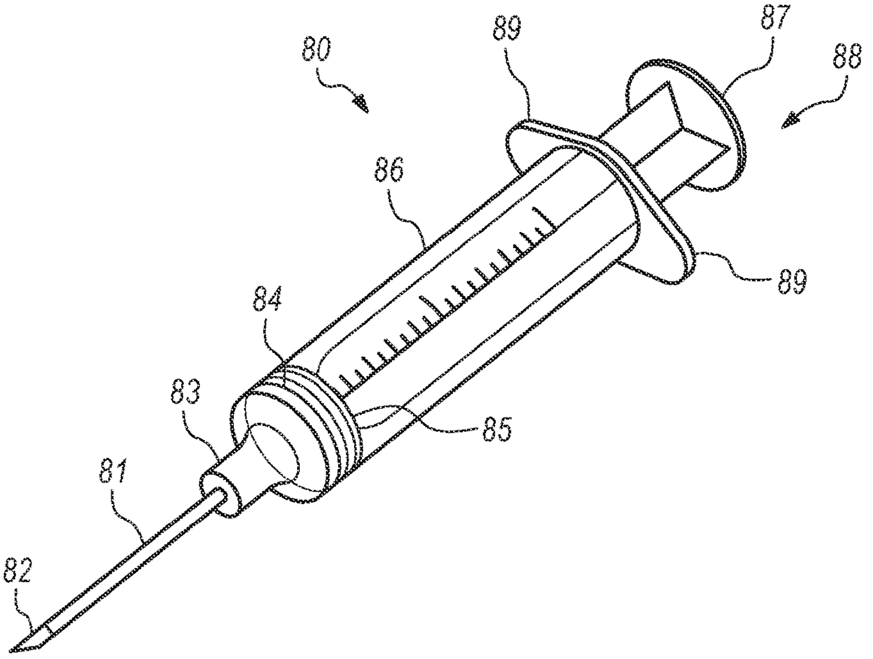
FIG. 8 is a perspective view of a syringe having a magnet near an opening in the tip of the syringe.

FIG. 8 is a perspective view of a syringe 80 having a tubular needle 81 that includes a magnet 82 forming the open tip at the distal end of the tubular needle 81. The tubular needle 81 and the hub 83 have internal passageways that provide fluid communication from the open tip of the needle 81 through the hub 83 and into the barrel 86 below a rubber stop 85. The rubber stop 85 may be moved along the axis of the barrel 86 by pulling or pushing a proximal end 87 of the plunger 88 to draw or expel fluid from the barrel 86. Furthermore, the barrel 86 may have a flange 89 that facilitates control over the syringe 80. The syringe barrel 86 and tip 83 are shown as a transparent or translucent plastic, but this is not required. Optionally, the syringe 80 may include a magnet 84 on the lower face of the rubber stop 85 to supplement or replace the magnet 82 at the tip of the tubular needle 81.

Figure 9A:
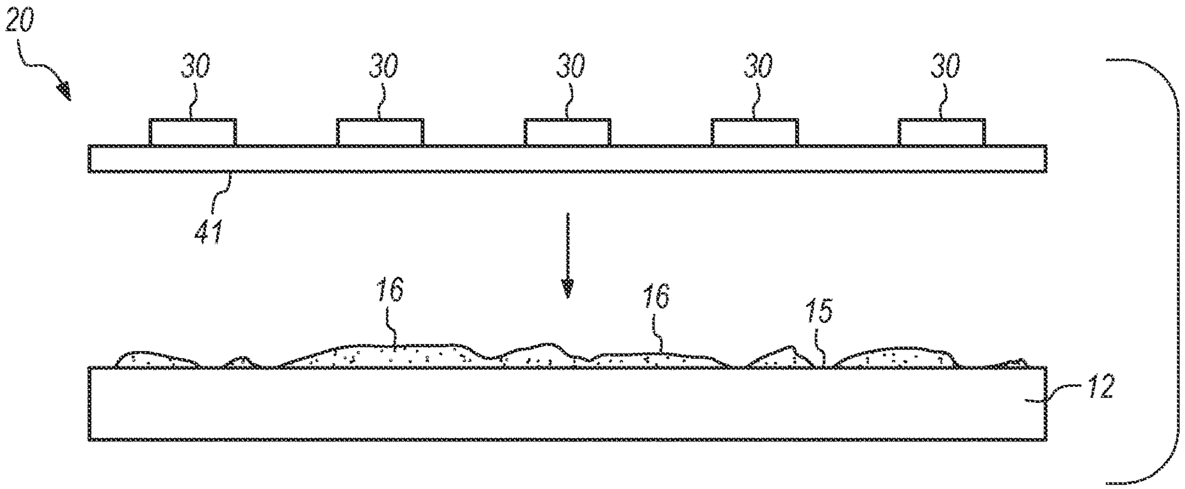
FIGS. 9A-D are a sequence of diagrams illustrating how the deposit of ferromagnetic liquid may be removed from the surface of a component using a cloth with magnets secured to one side of the cloth.
Figure 9B:
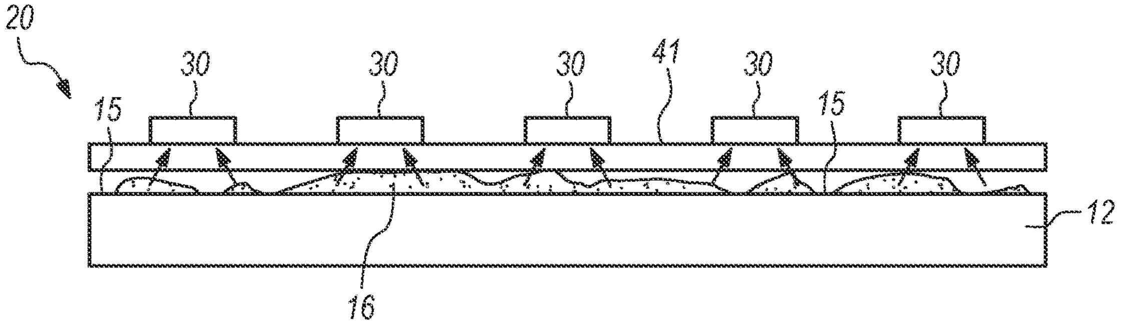
Figure 9C:
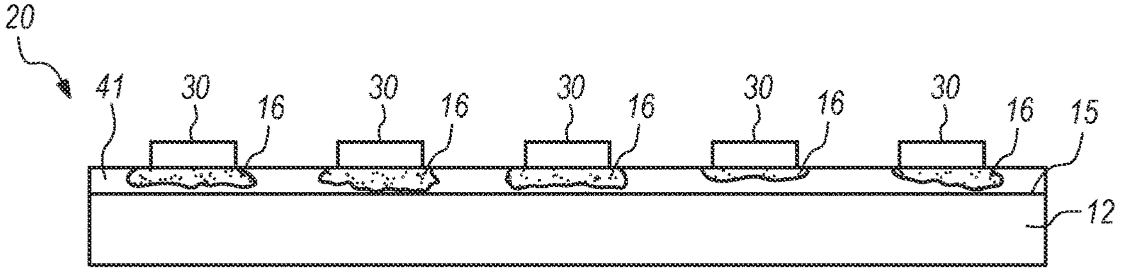
Figure 9D:
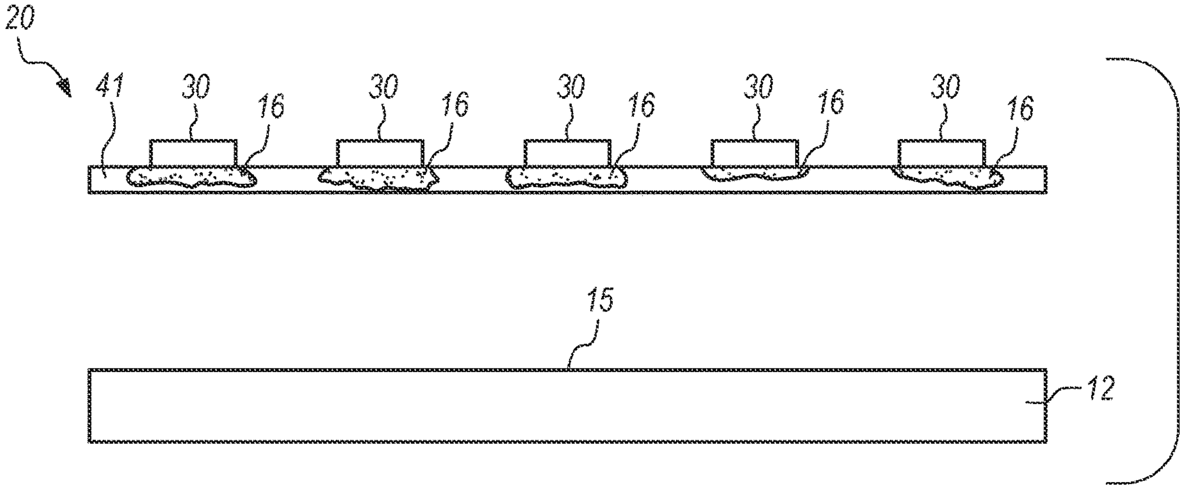

FIGS. 9A-D are a sequence of diagrams illustrating how a deposit of ferromagnetic liquid 16 may be removed from the surface 15 of a component 12 using a cloth sheet 20 with magnets 30 secured to one side of the cloth sheet. In FIG. 9A, the cloth layer 41 of the cloth sheet 20 is directed toward the surface 15 having the deposit of ferromagnetic liquid 16 thereon. In FIG. 9B, the cloth layer 41 of the cloth sheet 20 has been lowered to contact the surface 15 and the deposit of ferromagnetic liquid 16. Each magnet 30 forms a magnetic field that attracts the ferromagnetic liquid 16 (see directions arrows) from the surface 15 into the liquid-permeable cloth layer 41 toward the magnet 30. In FIG. 9C, the ferromagnetic liquid 16 has moved toward the magnets 30 under the force of each magnet's individual magnetic field. Optionally, some physical agitation by lateral movement, wiping or scrubbing of the cloth sheet 20 over the surface 15 may also encourage or facilitate movement of the ferromagnetic liquid 16 into the liquid-permeable cloth layer 41. In FIG. 9D, the cloth sheet 20 is no longer in contact with the surface 15 but the ferromagnetic liquid 16 has been retained within the cloth layer 41 of the cloth sheet 20 due, at least in part, to the magnetic field of the magnets 30. While the motion of the cloth sheet 20 in FIGS. 9A-D are illustrated as primarily a downward and upward motion (i.e., blotting), other motions of the cloth sheet 20 are equally effective, such as wiping. Furthermore, the ferromagnetic liquid 16 may be removed using any of the cloth sheets 20, 40, 50, 60 and the swab 70 in the same manner.

Figure 10A:
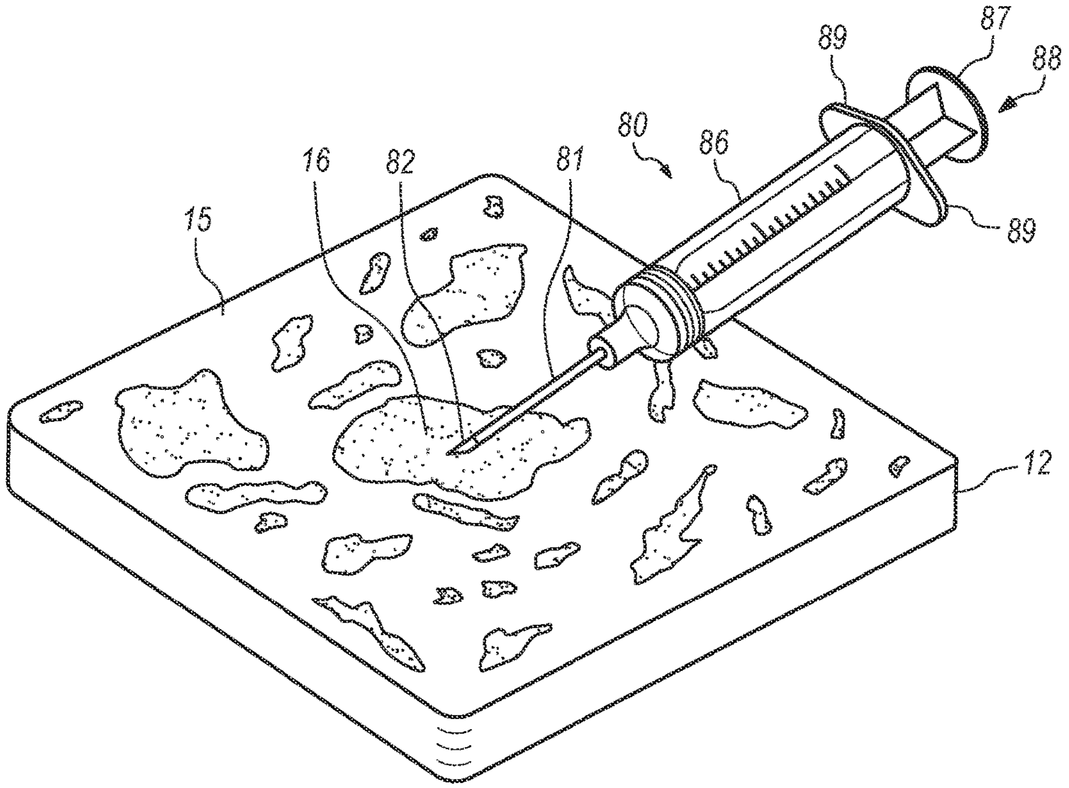
FIGS. 10A-B are a sequence of diagram illustrating how a large deposit or pool of ferromagnetic liquid may be removed from the surface of a component using a syringe having a magnet near the opening in the top of the syringe.
Figure 10B:
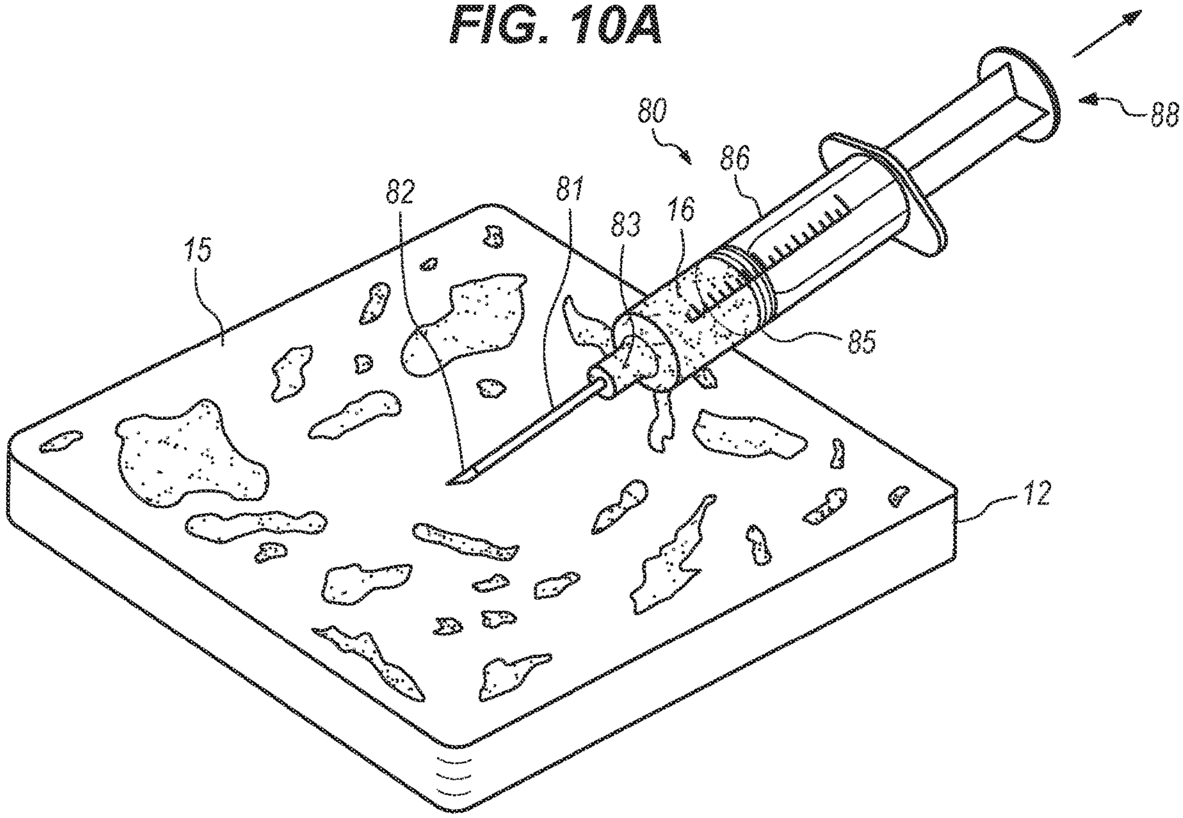

FIGS. 10A-B are a sequence of diagrams illustrating how a large deposit or pool of ferromagnetic liquid 16 may be removed from the surface 15 of the component 12 using the syringe 80 having a magnet 82 forming the open tip of the tubular needle 81. (See also FIG. 8). In FIG. 10A, the magnetic tip 82 of the needle 81 is positioned in or adjacent to a pool or bead of the ferromagnetic liquid 16 that remains on the surface 15 of the component 12. The magnet 82 attracts the ferromagnetic liquid 16 to the opening in the distal end of the needle 81. The opening in the magnet 82 that forms the tip of the needle 81 leads into the passageway through the needle 81 and the hub 83 leading to the barrel 86. Keeping the needle 81 in this position, FIG. 10B illustrates that a user has then actuated (pulled) the plunger 88 relative to the barrel 86 to form a suction that draws or pulls the ferromagnetic liquid 16 from the area of the open needle tip through the passageway and into the barrel 86 below the rubber stop 85. Subsequently, the plunger may be pressed into the barrel to dispense the ferromagnetic liquid into a container (not shown), such as a waste collection container or a recycling collection container. The syringe may be used to remove further deposits of the ferromagnetic liquid from the surface and dispense the ferromagnetic liquid into a container through any number of cycles.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A method, comprising:

separating a first component from engagement with a second component, wherein a ferromagnetic liquid is disposed between the first component and the second component and an amount of the ferromagnetic liquid remains on a surface of the first component after the second component has been separated from the first component; and removing a first portion of the ferromagnetic liquid that remains on the surface of the first component by placing a liquid-permeable cloth sheet into contact with the surface of the first component, wherein the liquid-permeable cloth sheet is secured to a plurality of magnets, wherein the plurality of magnets attract the first portion of the ferromagnetic liquid into the liquid-permeable cloth sheet and retain the first portion of the ferromagnetic liquid within the liquid-permeable cloth sheet.

2. The method of claim 1, wherein the first component is an electronic device, the second component is a cooling device, and the ferromagnetic liquid is a thermal interface material that increases heat conduction from the first component to the second component.

3. The method of claim 2, wherein the ferromagnetic liquid thermal interface material includes an alloy of gallium, indium and tin that has been infused with iron.

4. The method of claim 1, further comprising:

removing a second portion of the ferromagnetic liquid that remains on the surface of the first component by engaging a liquid-permeable swab in contact with the surface of the first component, wherein the liquid-permeable swab includes a wad of fibers secured to a distal end of a rod, wherein the distal end of the rod is formed by at least one magnet, and wherein the at least one magnet attracts the ferromagnetic liquid into the wad of fibers and retains the ferromagnetic liquid within the liquid-permeable swab wad of fibers.

5. The method of claim 1, further comprising:

removing a second portion of the ferromagnetic liquid that remains on the surface of the first component by positioning a needle tip of a syringe adjacent a pool of the ferromagnetic liquid that remains on the surface of the first component and actuating the syringe, wherein the syringe further includes a barrel and a plunger that is slidable within the barrel, wherein the needle tip includes at least one magnet and the needle forms a passageway into the barrel below the plunger, wherein the at least one magnet attracts the pool of ferromagnetic liquid to an opening in the needle tip that leads to the passageway, and wherein actuating the syringe includes actuating the plunger to pull the ferromagnetic liquid from the opening through the passageway into the barrel.

6. The method of claim 5, wherein the at least one magnet forms the needle tip and extends around the opening.

7. A device for removing a ferromagnetic liquid from a surface, comprising:

a plurality of permanent magnets capable of attracting the ferromagnetic liquid; and a liquid-permeable cloth sheet covering at least one surface of the plurality of magnets, wherein the liquid-permeable cloth sheet is configured to directly contact a deposit of the ferromagnetic liquid disposed on a surface and the plurality of magnets are configured to draw the ferromagnetic liquid into the liquid-permeable cloth sheet and retain the ferromagnetic liquid within the liquid-permeable material cloth sheet.

8. The device of claim 7, wherein the ferromagnetic liquid is a liquid metal thermal interface material infused with iron.

9. The device of claim 8, wherein the ferromagnetic liquid thermal interface material includes an alloy of gallium, indium and tin that has been infused with iron.

10. The device of claim 7, wherein the plurality of magnets are secured to the liquid-permeable cloth sheet by insertion into a plurality of pockets formed in the liquid-permeable cloth sheet.

11. The device of claim 7, wherein each of the plurality of magnets are secured to a back side of the liquid-permeable cloth sheet in a spaced apart pattern leaving a front side of the liquid-permeable cloth sheet for contacting the surface and preventing direct contact between any of the plurality of magnets and the surface.

12. A device for removing a ferromagnetic liquid from a surface, comprising:

at least one magnet capable of attracting the ferromagnetic liquid; and a liquid-permeable material secured to a distal end of a rod, wherein the distal end of the rod is formed by the at least one magnet, wherein the liquid-permeable material is configured to directly contact a deposit of the ferromagnetic liquid disposed on a surface and the at least one magnet is configured to draw the ferromagnetic liquid into the liquid-permeable material and retain the ferromagnetic liquid within the liquid-permeable material.

13. The device of claim 12, wherein the liquid-permeable material is a wad of fibers.

14. The device of claim 12, wherein the liquid-permeable material forms a disposable cover that is manually securable to the distal end of the rod and manually removable from the distal end.

15. The device of claim 12, wherein the liquid-permeable material is a wad of cotton fibers.

16. The device of claim 14, further comprising:

a liquid impermeable liner disposed between the liquid-permeable material and the at least one magnet formed at the distal end of the rod, wherein the liquid impermeable liner prevents the ferromagnetic liquid from contacting the at least one magnet.

17. The device of claim 7, wherein the plurality of magnets are ring shaped and stitched to one side of the liquid-permeable cloth sheet.

18. The method of claim 5, wherein the syringe further includes another magnet on a lower face of a rubber stop secured to the plunger.

19. The method of claim 4, further comprising:

removing a third portion of the ferromagnetic liquid that remains on the surface of the first component by positioning a needle tip of a syringe adjacent a pool of the ferromagnetic liquid that remains on the surface of the first component and actuating the syringe, wherein the syringe further includes a barrel and a plunger that is slidable within the barrel, wherein the needle tip includes at least one magnet and the needle forms a passageway into the barrel below the plunger, wherein the at least one magnet attracts the pool of ferromagnetic liquid to an opening in the needle tip that leads to the passageway, and wherein actuating the syringe includes actuating the plunger to pull the ferromagnetic liquid from the opening through the passageway into the barrel.

20. The method of claim 19, wherein the syringe is used before the liquid-permeable cloth sheet, and wherein the liquid-permeable cloth sheet is used before the liquid-permeable swab.

* * * * *